US008131317B2

(12) United States Patent
Lee

(10) Patent No.: US 8,131,317 B2
(45) Date of Patent: Mar. 6, 2012

(54) APPARATUS AND METHOD FOR DOWNLOADING SIM DATA IN MOBILE COMMUNICATION SYSTEM

(75) Inventor: Sung-Jun Lee, Suwon-si (KR)

(73) Assignee: Samsung Electronics Co. Ltd (KR)

( * ) Notice: Subject to any disclaimer, the term of this patent is extended or adjusted under 35 U.S.C. 154(b) by 1231 days.

(21) Appl. No.: 11/842,809

(22) Filed: Aug. 21, 2007

(65) Prior Publication Data

US 2008/0051062 A1 Feb. 28, 2008

(30) Foreign Application Priority Data

Aug. 28, 2006 (KR) .................. 10-2006-0081772

(51) Int. Cl.
*H04M 1/00* (2006.01)

(52) U.S. Cl. ........ 455/558; 455/411; 455/419; 455/502; 455/432.1; 455/435.2

(58) Field of Classification Search .............. 455/558, 455/410–411, 418–420, 432.1, 435.2, 502
See application file for complete search history.

(56) References Cited

U.S. PATENT DOCUMENTS

| | | | | |
|---|---|---|---|---|
| 5,950,130 | A * | 9/1999 | Coursey ................. | 455/432.1 |
| 6,148,197 | A * | 11/2000 | Bridges et al. ........... | 455/432.3 |
| 6,285,869 | B1 * | 9/2001 | Shannon et al. .......... | 455/411 |
| 6,889,059 | B1 * | 5/2005 | Fragola ................... | 455/558 |
| 7,139,570 | B2 * | 11/2006 | Elkarat et al. ........... | 455/432.3 |
| 7,146,191 | B2 * | 12/2006 | Kerner et al. ............ | 455/558 |
| 7,369,851 | B2 * | 5/2008 | Okonnen et al. ......... | 455/435.1 |
| 2003/0224819 | A1 * | 12/2003 | Sanchez ................. | 455/552.1 |
| 2004/0023689 | A1 * | 2/2004 | Ahonen ................. | 455/558 |
| 2004/0235523 | A1 * | 11/2004 | Schrire et al. ........... | 455/558 |
| 2005/0064862 | A1 * | 3/2005 | Castrogiovanni et al. .... | 455/420 |
| 2005/0136979 | A1 * | 6/2005 | Dietl et al. ............. | 455/558 |
| 2006/0064458 | A1 | 3/2006 | Gehrmann | |
| 2007/0050365 | A1 * | 3/2007 | Laitinen et al. ........... | 707/9 |
| 2007/0060200 | A1 * | 3/2007 | Boris et al. ............. | 455/558 |
| 2007/0077966 | A1 * | 4/2007 | Huang ................. | 455/558 |
| 2007/0082704 | A1 * | 4/2007 | Nakano et al. ........... | 455/558 |
| 2007/0191057 | A1 * | 8/2007 | Kamada ................ | 455/558 |
| 2007/0207798 | A1 * | 9/2007 | Talozi et al. ............ | 455/423 |
| 2009/0069048 | A1 * | 3/2009 | Yang ................... | 455/558 |

FOREIGN PATENT DOCUMENTS

CN 1695362 11/2005

* cited by examiner

*Primary Examiner* — Sharad Rampuria
(74) *Attorney, Agent, or Firm* — The Farrell Law Firm, P.C.

(57) ABSTRACT

Provided are an apparatus and a method for downloading Subscriber Identity Module (SIM) data in a mobile communication system, which includes an authentication server that stores authentication information and a list of registered networks; a service provider server that stores SIM data and transmits the SIM data in response to a request for the SIM data; and a mobile communication terminal that receives user authentication from the authenticating server, checks the list of the networks, allows a network, which is to be accessed, to be selected from among the list of the networks, and accesses the service provider server in the selected network so as to download the SIM data.

19 Claims, 5 Drawing Sheets

APPARATUS AND METHOD FOR DOWNLOADING SIM DATA IN MOBILE COMMUNICATION SYSTEM

PRIORITY

This application claims priority under 35 U.S.C. §119 to an application filed in the Korean Intellectual Property Office on Aug. 28, 2006 and assigned Serial No. 2006-81772, the contents of which are incorporated herein by reference.

BACKGROUND OF THE INVENTION

1. Field of the Invention

The present invention relates generally to an apparatus and method for downloading Subscriber Identity Module (SIM) data in a mobile communication system, and, in particular, to an apparatus and method for downloading SIM data to replace an attachable SIM card in a mobile communication terminal, without the SIM card.

2. Description of the Related Art

A Subscriber Identity Module (SIM) card is a type of smart card for storing user authentication information, communication encrypting information and various user information. In general, mobile equipment is combined with a SIM card, thus forming a mobile communication terminal (a mobile station). The mobile communication terminal can access a mobile communication network using authentication information and encryption information stored in the SIM card, can establish communications and can refer to and use user data, such as a phone book or a short message, which is also stored in the SIM card.

Since functions of authenticating, encrypting for communication, and storing various information can be separated using SIM cards, it is possible to install and use one SIM card in each of a plurality of mobile communication terminals, or each of a plurality of SIM cards in one mobile communication terminal.

However, a user must manage the SIM card by himself or herself, and may lose or damage the SIM card. Also, the user must always have possession of the SIM card with even when the user moves to another place. For example, even during a foreign travel or a business trip, the user must have the SIM card with himself or herself in order to use a mobile communication terminal. Since the SIM card contacts a mobile communication terminal by electrical contact, i.e. in a hardware manner, a contact error may occur. Also, a mobile communication terminal must include a device for contacting the SIM card, thereby increasing the size of the mobile communication terminal.

SUMMARY OF THE INVENTION

An aspect of the present invention is to substantially solve at least the above problems and/or disadvantages and to provide at least the advantages below. Accordingly, an aspect of the present invention is to provide an apparatus and method for downloading Subscriber Identity Module (SIM) data in a mobile communication system.

Another aspect of the present invention is to provide an apparatus and method for downloading SIM data using user authentication in a mobile communication system having an authenticating server that performs user authentication.

Another aspect of the present invention is to provide an apparatus and method for downloading SIM data from a service provider server in a mobile communication system.

Another aspect of the present invention is to provide an apparatus and method for downloading SIM data to replace an attachable SIM card, in a mobile communication terminal without the SIM card.

According to one aspect of the present invention, there is provided a mobile communication system for downloading SIM data. The system includes an authenticating server for storing authentication information and a list of registered networks; a service provider server for storing the SIM data and transmits it in response to a request for the SIM data; and a mobile communication terminal for receiving user authentication from the authenticating server and then checking the list of the networks, allowing a network, which is to be accessed, to be selected from among the list of the networks, accessing the service provider server in the selected network, and downloading the SIM data from the service provider server.

According to another aspect of the present invention, there is provided an apparatus for downloading SIM data in a mobile communication system. The apparatus includes an authenticating unit for receiving authentication information for a user; a communication unit for accessing the authentication server in order to exchange messages for authentication with the authenticating server, and accessing the service provider server in order to download the SIM data; a SIM module for storing the downloaded SIM data; and a controller for controlling an authentication requesting message, which contains the authentication information received via the authenticating unit, to be created and transmitted to the authenticating server, a list of networks registered to be output when an authentication response message containing the list of the networks is received from the authenticating server, a network, which is to be accessed, to be selected from among the list of the networks, and a SIM data requesting message to be transmitted to the service provider server in the selected network, the SIM data received from the service provider server to be stored in the SIM module unit According to another aspect of the present invention, there is provided a method of downloading SIM data to a mobile communication terminal. The method includes receiving authentication information and transmitting an authentication requesting message containing the authentication information to an authenticating server, when an event requesting SIM data occurs; receiving an authentication response message containing a list of registered networks from the authenticating server; allowing a network, which is to be accessed, to be selected from among the list of the networks; creating a SIM data requesting message and transmitting the message to a service provider server in the selected network; and downloading the SIM data from the service provider server.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail when it is determined that they would obscure the invention in unnecessary detail.

The present invention provides an apparatus and method for downloading Subscriber Identity Module (SIM) data that replaces a SIM card in a mobile communication terminal without an attachable/detachable SIM card. In describing the present invention, data stored in a SIM card is defined as "SIM data".

Figure 1:
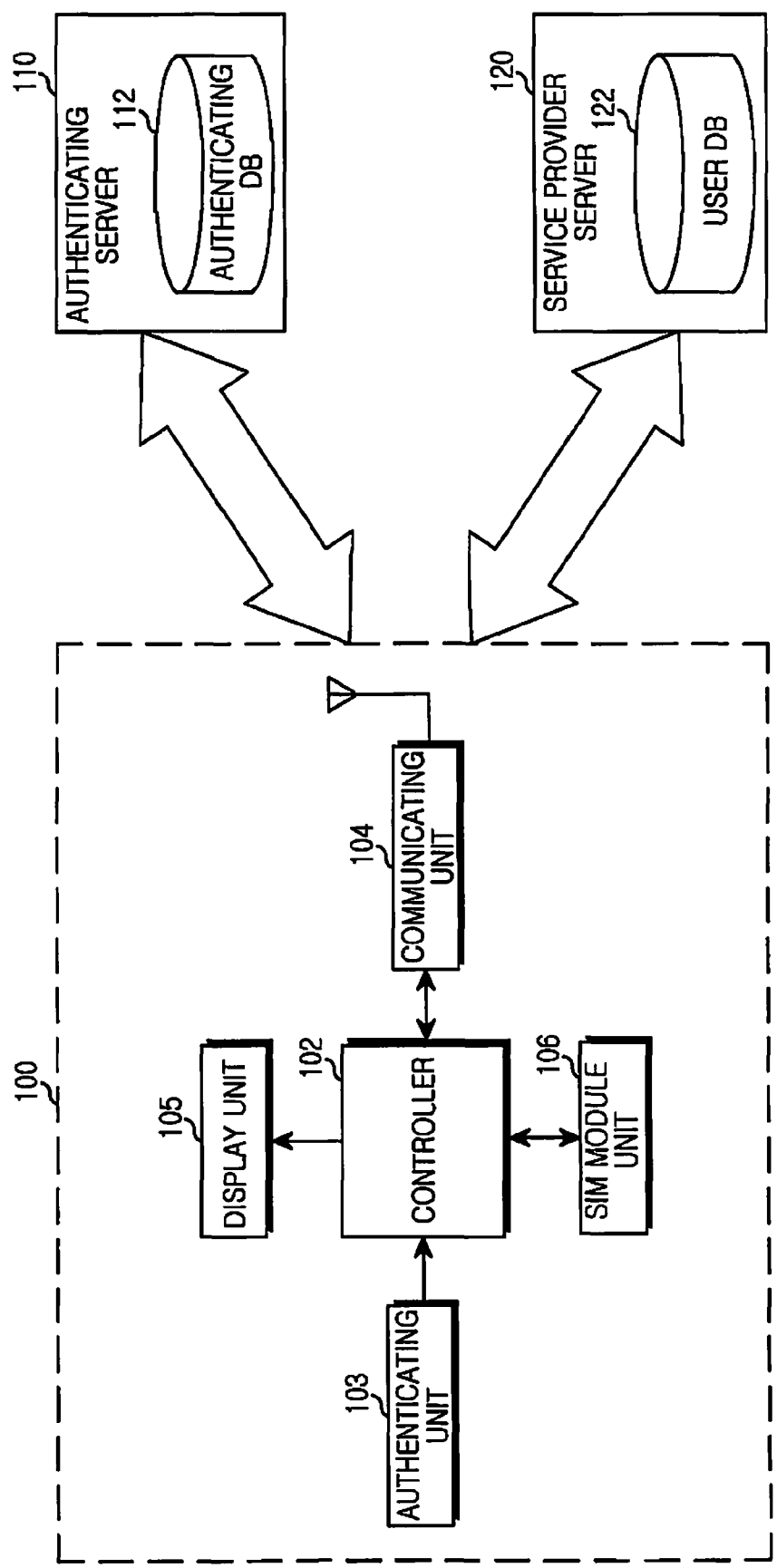
FIG. 1 is a block diagram of an apparatus for downloading Subscriber Identity Module (SIM) data in a mobile communication system, according to the present invention.

FIG. 1 is a block diagram of an apparatus for downloading SIM data in a mobile communication system, according to the present invention. According to the current embodiment of the present invention, as illustrated in FIG. 1, the mobile communication system includes a mobile communication terminal (hereinafter "terminal") 100, an authenticating server 110 and a service provider server 120.

The terminal 100 includes a controller 102, an authenticating unit 103, a communication unit 104, a display unit 105 and a SIM module unit 106.

The authenticating unit 103 receives authentication information (i.e. information about the iris, the fingerprint, a secret number, etc.) of a user, which is necessary to authenticate the user.

In order to establish communication with the authenticating server I 10 or the service provider server 120, the communication unit 104, when receiving data, despreads and channel decodes a radio frequency signal received via an antenna (not shown) by decreasing the frequency thereof, and, when transmitting data, channel codes and spreads data that is to be transmitted, increases the frequency of the data, and transmits the data via the antenna.

The display unit 105 outputs a list of networks registered by a user, under control of the controller 102.

The SIM module unit 106 is a device that replaces a SIM card, and receives and stores SIM data for a user from the service provider server 120, under control of the controller 102.

If a request for the SIM data in order to use the terminal 100 is sensed, the controller 102 controls an authentication requesting message that contains the authentication information received from the authenticating unit 103 for transmission to the authenticating server 110. If an authentication response message that contains the list of the networks is received from the authenticating server 110, the controller 102 controls the list of the networks to be output, a network to be accessed, to be selected from among the list of the networks, a SIM data requesting message to be transmitted to the service provider server 120 in the selected network, and the SIM data received from the service provider server 120 to be stored in the SIM module unit 106.

After downloading the SIM data, the controller 102 controls whether a change occurs in the SIM data, to be determined at predetermined intervals of time, and controls the change to be transmitted to the service provider server 120 when the change occurs in the SIM data. When the terminal 100 completes using the SIM data, the controller 102 also controls whether the change occurs in the SIM data to be determined, and controls the change to be transmitted to the service provider server 120 when the change occurs in the SIM data.

The authenticating server 110 includes an authenticating database 112 that stores authentication information for each user and a list of registered networks. Upon receiving an authentication requesting message from the terminal 100, the authenticating server 110 compares the authentication information contained in the authentication requesting message with the stored authentication information, to authenticate the user. If the user is authenticated, the authenticating server 110 creates an authentication response message containing the list of the networks and transmits the authentication response message to the terminal 100. If the user is not authenticated, the authenticating server 110 creates an authentication response message indicating that the authentication failed, and transmits the authentication response message to the terminal 100.

Lastly, the service provider server 120 includes a user database 122 that stores SIM data for each of the users. Upon receiving a SIM data requesting message from the terminal 100, the service provider server 120 searches the user database 122 for the SIM data for the user who transmitted the message, and transmits the searched SIM data to the terminal 100. Also, the service provider server 120 updates the SIM data stored in the user database 122 and stores the updated SIM data in the user database 122 at predetermined intervals of time or when use of the SIM data is completed, in response to an update message containing a change in the SIM data, received from the terminal 100.

A method of downloading SIM data in a mobile communication system according to an embodiment of the present invention will now be described with reference to the accompanying drawings.

Figure 2:
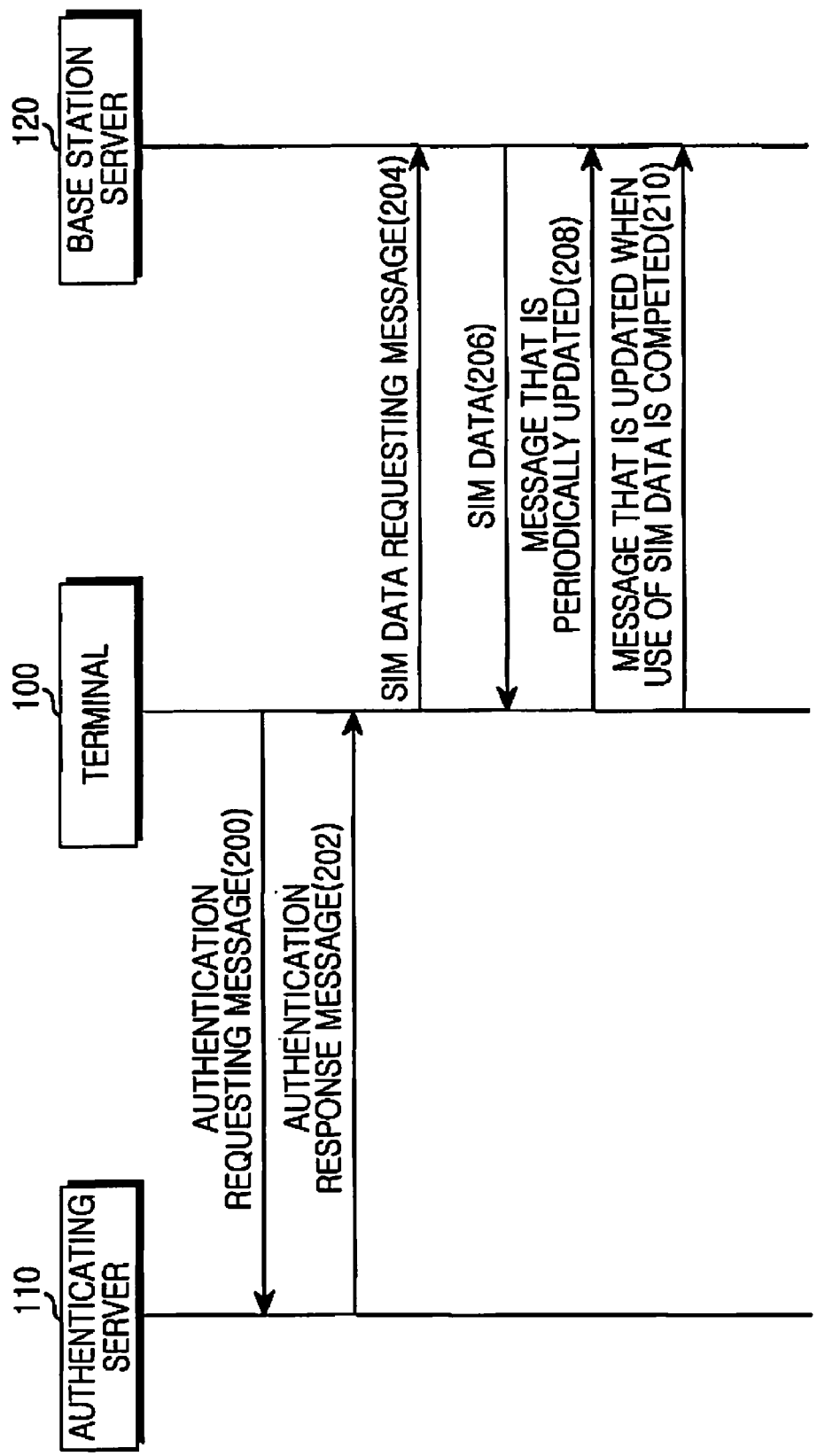
FIG. 2 is a flowchart illustrating the flow of messages for managing SIM data in a mobile communication system, according to the present invention.

FIG. 2 is a flowchart illustrating the flow of messages for managing SIM data in a mobile communication system, according to the present invention. Referring to FIG. 2, a terminal 100 first transmits an authentication requesting message 200 containing authentication information to an authenticating server 110 in order to use SIM data. The authenticating server 110 creates an authentication response message 202 according to whether authentication succeeds, and transmits the authentication message to the terminal 100. The terminal 100 transmits a SIM data requesting message 204 to a service provider server (i.e. base station server) 120 via a network selected from among a list of registered networks that are received when authentication succeeds, and receives the SIM data 206 from the service provider server 120. Also, the terminal 100 creates and transmits an update message 208 containing a change in the SIM data 206 at predetermined intervals of time. When use of the SIM data 206 is completed, the terminal 100 creates and transmits an update message 210 containing a change in the SIM data 206.

Figure 3:
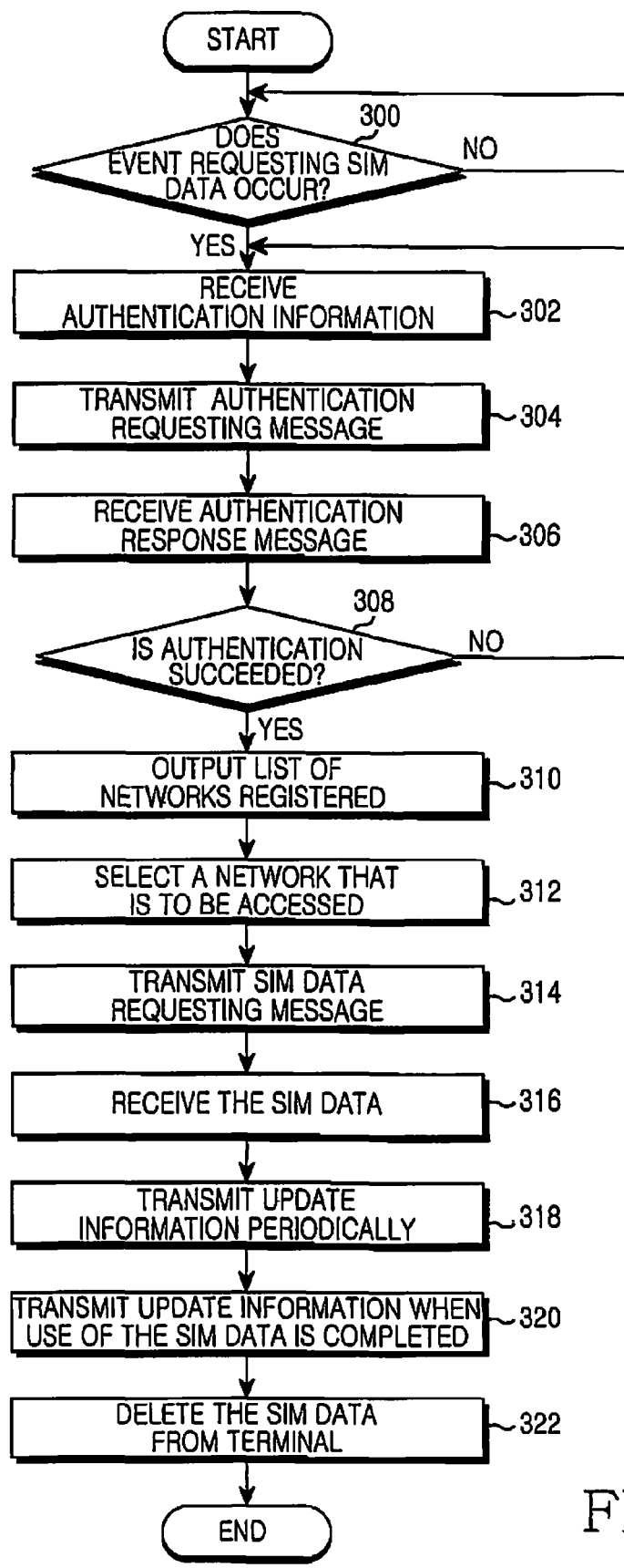
FIG. 3 is a flowchart illustrating a procedure of downloading SIM data in a mobile communication system, according to the present invention.

FIG. 3 is a flowchart illustrating a procedure of downloading SIM data to a terminal of a mobile communication system, according to the present invention. Referring to FIGS. 1 and 3, the terminal 100 senses whether an event requesting SIM data occurs in step 300. If the event occurs, the terminal 100 receives authentication information (e.g. iris information, fingerprint information, or a secret number) that is necessary to authenticate a user in step 302. Next, the terminal 100 creates an authentication requesting message containing the authentication information, and transmits the authenticating request message to the authenticating server 110 in step 304.

Next, the terminal 100 receives an authentication response message from the authenticating server 110 in step 306 and checks the authentication response message so as to determine whether the authentication succeeds in step 308. If it is determined that the authentication fails, the terminal 100 returns to step 302.

If it is determined that the authentication has succeeded, the terminal 100 outputs a list of networks registered by the user, which is included in the authentication response message in step 310. Next, a network which is to be accessed is then selected from among the list of the networks in step 312. Next, the terminal 100 creates a SIM data requesting message, and transmits the SIM data requesting message to the service provider server 120 in the selected network via the selected network in step 314. Next, the terminal 100 receives the SIM data from the service provider server 120 in step 316.

Thereafter, the terminal 100 periodically determines whether the SIM data has been changed, and transmits update information containing the changed SIM data to the service provider server 120 in step 318. Next, if completing using the SIM data, the terminal 100 determines whether the SIM data has been changed, and transmits update information containing the changed SIM data to the service provider server 120 in step 320. Lastly, the terminal 100 deletes the SIM data therefrom in step 322.

Figure 4:
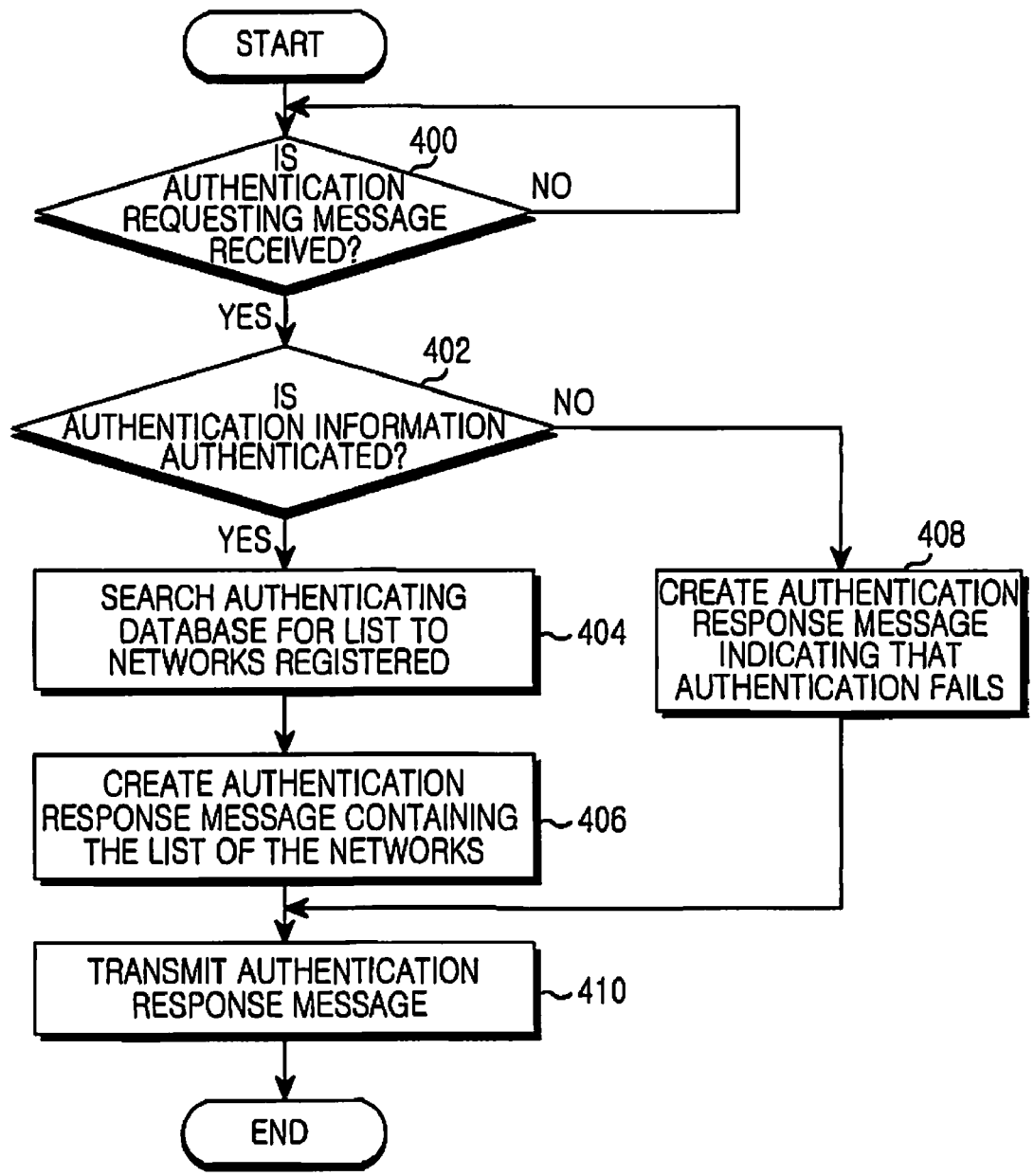
FIG. 4 is a flowchart illustrating a procedure of user authentication for a terminal that is to download SIM data from an authenticating server of a mobile communication system, according to the present invention.

FIG. 4 is a flowchart illustrating a procedure of user authentication for a terminal that is to download SIM data from an authenticating server of a mobile communication system, according to the present invention. Referring to FIGS. 1 and 4, when the authenticating server 110 receives an authentication requesting message containing authentication information from the terminal 100 in step 400, the authenticating server 110 searches the authenticating database 112 in order to authenticate the authentication information in step 402.

If it is determined that the authentication information is authenticated, the authenticating server I 10 searches the authenticating database 112 for a list of networks registered by a user in step 404. Next, the authenticating server 110 creates an authentication response message containing the list of the networks in step 406, and transmits the authentication response message to the terminal 100 in step 410.

If it is determined that the authentication information is not authenticated, the authenticating server 110 creates an authentication response message indicating that the authentication failed in step 408, and transmits the authentication response message to the terminal 100 in step 410.

Figure 5:
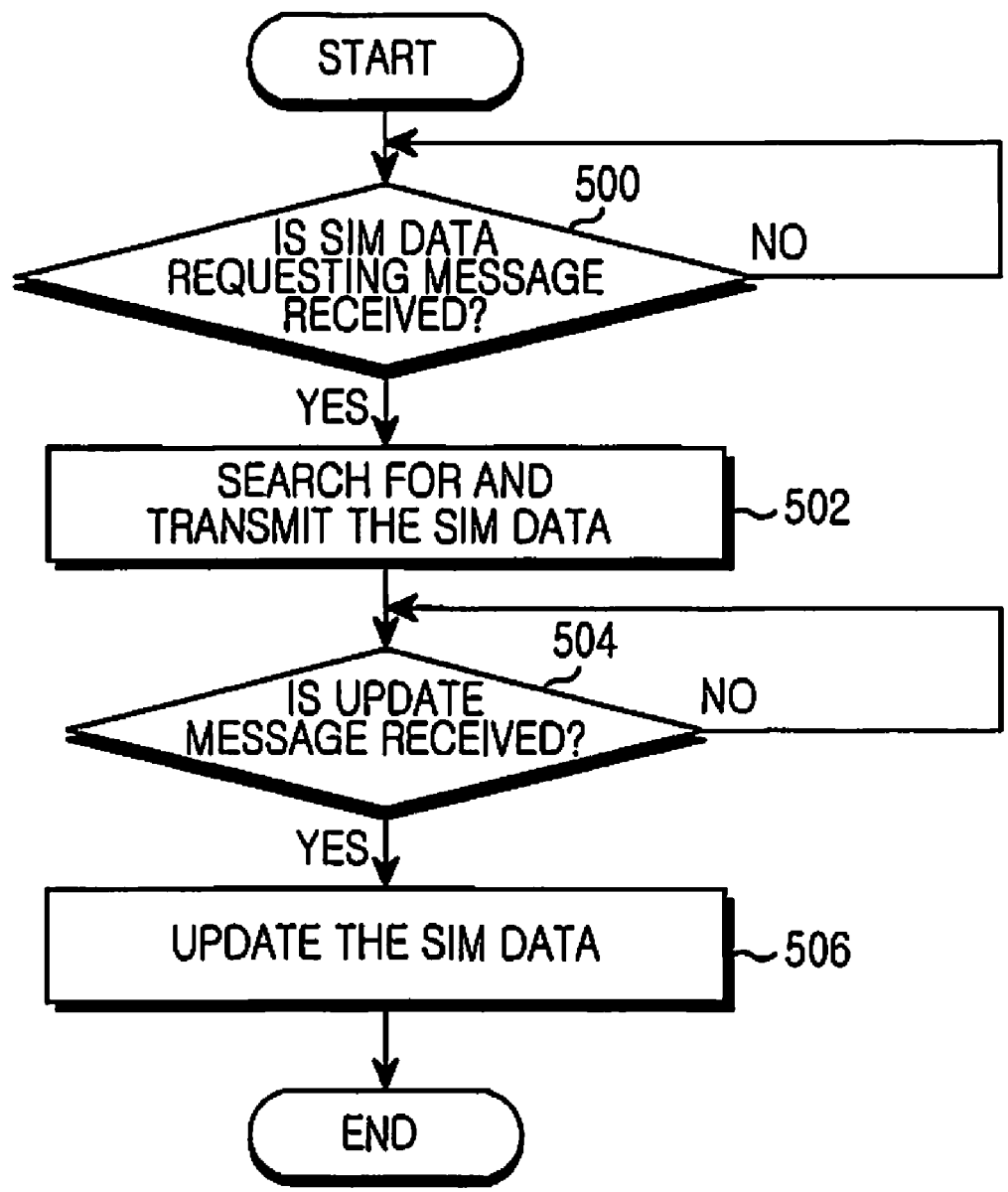
FIG. 5 is a flowchart illustrating a procedure of transmitting SIM data from a service provider server of a mobile communication system to a terminal, according to the present invention.

FIG. 5 is a flowchart illustrating a procedure of transmitting SIM data from a service provider server of a mobile communication system to a terminal, according to the present invention. Referring to FIGS. 1 and 5, when receiving a SIM data requesting message in step 500, the service provider server 120 searches the user database 122, which stores SIM data for each of users, for the SIM data for the user who transmitted the message, and then transmits the searched SIM data to the terminal 100 in step 502.

Next, the service provider server 120 checks if an update message is received from the terminal 100 at predetermined intervals or when use of SIM data is completed in step 504. If it is determined that an update message is received, the service provider server 120 updates the SIM data corresponding to a change included in the update message, and stores the updated SIM data in the user database 122 in step 506.

As described above, the present invention provides an apparatus and method for downloading SIM data in a mobile communication system having an authenticating server for user authentication, in which use authentication is performed and SIM data is downloaded from a service provider server that stores SIM data for each user, thereby performing the operation of a SIM card without the SIM card.

Alternate embodiments of the present invention can also include computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile communication system for downloading Subscriber Identity Module (SIM) data, the system comprising:
    an authenticating server for storing authentication information and a list of networks registered;
    a service provider server for storing SIM data and transmitting the SIM data; and
    a mobile communication terminal receiving user authentication from the authenticating server, checking the list of networks, allowing a network, which is to be accessed, to be selected from among the list of networks, accessing the service provider server in the selected network, and downloading the SIM data from the service provider server,
    wherein, after the SIM data is downloaded, a controller of the mobile communication terminal determines whether a change occurs in the SIM data to be determined at predetermined intervals of time, and an update message containing the change to be created and transmitted to the service provider server when the change occurs in the SIM data.

2. An apparatus for downloading Subscriber Identity Module (SIM) data in a mobile communication system, the apparatus comprising:
    an authenticating unit for receiving authentication information for a user;
    a communication unit for accessing the authentication server to exchange messages for authentication with the authenticating server, and accessing a service provider server to download the SIM data;
    a SIM module unit for storing the downloaded SIM data; and
    a controller for controlling an authentication requesting message, which contains the authentication information received via the authenticating unit, to be created and transmitted to the authenticating server, a list of networks registered to be output when an authentication response message containing the list of networks is received from the authenticating server, a network, which is to be accessed, to be selected from among the list of networks, and a SIM data requesting message to be transmitted to the service provider server in the selected network, the SIM data received from the service provider server to be stored in the SIM module unit, wherein, after the SIM data is downloaded, the controller determines whether a change occurs in the SIM data to be determined at predetermined intervals of time, and an update message containing the change to be created and transmitted to the service provider server when the change occurs in the SIM data.

3. The apparatus of claim 2, wherein, after the SIM data is downloaded, the controller controls whether a change occurs in the SIM data to be determined when use of the SIM data is completed, and an update message containing the change to be created and transmitted to the service provider server when the change occurs in the SIM data.

4. The apparatus of claim 2, wherein the authenticating server comprises an authenticating database storing authentication information for each of a plurality of users and the list of networks, compares the authentication information contained in the authentication requesting message with the stored authentication information to authenticate a user requesting the authentication when the authentication requesting message is received, and creates and transmits the authentication response message containing the list of networks when the user is authenticated.

5. The apparatus of claim 4, wherein, if the user is not authenticated, the authenticating server creates and transmits the authentication response message indicting that the authentication failed.

6. The apparatus of claim 2, wherein the service provider server comprises a user database storing SIM data for each of the plurality of users, and searches the user database for SIM data of a user who transmits the SIM data requesting message and transmits the searched SIM data when the SIM data requesting message is received.

7. The apparatus of claim 2, wherein, when receiving the update message containing the change in the SIM data, the service provider server updates the SIM data corresponding to the change and stores the updated SIM data in a user database.

8. The apparatus of claim 3, wherein, when receiving the update message containing the change in the SIM data, the service provider server updates the SIM data corresponding to the change and stores the updated SIM data in a user database.

9. A method of downloading Subscriber Identity Module (SIM) data to a mobile communication terminal, the method comprising:
receiving authentication information and transmitting an authentication requesting message containing the authentication information to an authenticating server, when an event requesting SIM data occurs;
receiving an authentication response message containing a list of registered networks from the authenticating server;
allowing a network, which is to be accessed, to be selected from among the list of networks;
creating a SIM data requesting message and transmitting the message to a service provider server in a selected network; and
downloading the SIM data from the service provider server,
wherein, after the SIM data is downloaded, determining whether a change occurs in the SIM data to be determined at predetermined intervals of time, and an update message containing the change to be created and transmitted to the service provider server when the change occurs in the SIM data.

10. The method of claim 9, after downloading the SIM data, further comprising periodically determining whether a change occurs in the SIM data, and creating an update message containing the change and transmitting the update message to the service provider server when the change occurs in the SIM data.

11. The method of claim 9, after downloading the SIM data, further comprising determining whether a change occurs in the SIM data when use of the SIM data is completed, and creating an update message containing the change and transmitting the update message to the service provider server when the change occurs in the SIM data.

12. The method of claim 9, wherein the authenticating server comprises an authentication database storing authentication information for each of a plurality of users and a list of networks registered, compares the stored authentication information with the authentication information contained in the authentication requesting message to authenticate a user requesting authentication when the authentication requesting message is received, and creates and transmits the authentication response message containing the list of networks when the user is authenticated.

13. The method of claim 12, wherein, if the user is not authenticated, the authenticating server creates and transmits the authentication response message indicating that the authentication fails.

14. The method of claim 9, wherein the service provider server comprises a user database storing SIM data for each of a plurality of users, and searches the user database for SIM data of a user who transmits the SIM data requesting message and transmits the searched SIM data when the message is received.

15. The method of claim 10, wherein, when receiving the update message containing the change in the SIM data, the service provider server updates the SIM data corresponding to the change and stores the updated SIM data in a user database.

16. The method of claim 11, wherein, when receiving the update message containing the change in the SIM data, the service provider server updates the SIM data corresponding to the change and stores the updated SIM data in a user database.

17. An apparatus for downloading Subscriber Identity Module (SIM) data in a mobile communication system, the apparatus comprising:
means for transmitting an authentication requesting message containing an authentication information to an authenticating server;
means for receiving an authentication response message containing a list of registered networks from the authenticating server;
means for allowing a network to be selected from among the list of networks;
means for transmitting a SIM data requesting message to a service provider server in a selected network; and
means for downloading the SIM data from the service provider server,
wherein, after the SIM data is downloaded, determining whether a change occurs in the SIM data to be determined at predetermined intervals of time, and an update message containing the change to be created and transmitted to the service provider server when the change occurs in the SIM data.

18. A computer-readable recording medium having recorded thereon a program for downloading Subscriber Identity Module (SIM) data to a mobile communication terminal comprising:
- a first code segment, receiving authentication information and transmitting an authentication requesting message containing the authentication information to an authenticating server, when an event requesting SIM data occurs;
- a second code segment, receiving an authentication response message containing a list of registered networks from the authenticating server;
- a third code segment, allowing a network, which is to be accessed, to be selected from among the list of networks;
- a fourth code segment, creating a SIM data requesting message and transmitting the message to a service provider server in a selected network; and
- a fifth code segment, downloading the SIM data from the service provider server,
- wherein, after the SIM data is downloaded, determining whether a change occurs in the SIM data to be determined at predetermined intervals of time, and an update message containing the change to be created and transmitted to the service provider server when the change occurs in the SIM data.

19. An apparatus for downloading Subscriber Identity Module (SIM) data in a mobile communication system, the apparatus comprising:
- an authenticating unit for receiving authentication information for a user;
- a communication unit for accessing the authentication server to exchange messages for authentication with the authenticating server, and accessing a service provider server to download the SIM data; and
- a controller for controlling an authentication requesting message, which contains the authentication information received via the authenticating unit, to be transmitted to the authenticating server, an authentication response message containing the list of networks is received from the authenticating server, a network, to be selected from among the list of networks, and a SIM data requesting message to be transmitted to the service provider server in the selected network, the SIM data received from the service provider server,
- wherein, after the SIM data is downloaded, the controller determines whether a change occurs in the SIM data to be determined at predetermined intervals of time, and an update message containing the change to be created and transmitted to the service provider server when the change occurs in the SIM data.

* * * * *